US008711899B2

(12) United States Patent
Deltour et al.

(10) Patent No.: US 8,711,899 B2
(45) Date of Patent: Apr. 29, 2014

(54) METHOD AND DEVICE FOR DETERMINING A SET OF FREQUENCIES THAT CAN BE USED FOR TRANSMITTING INFORMATION BETWEEN RADIO TRANSCEIVERS OF A NETWORK OPERATING WITH FREQUENCY HOPPING

(71) Applicant: Thales, Neuilly sur Seine (FR)

(72) Inventors: Bruno Deltour, Colombes Cedex (FR); Yves Singlas, Colombes Cedex (FR); Thibault De Moegen, Colombes Cedex (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/656,204

(22) Filed: Oct. 19, 2012

(65) Prior Publication Data
US 2013/0051430 A1 Feb. 28, 2013

Related U.S. Application Data

(63) Continuation of application No. PCT/FR2011/050892, filed on Apr. 19, 2011.

(30) Foreign Application Priority Data

Apr. 20, 2010 (FR) ...................................... 10 01675

(51) Int. Cl.
*H04B 1/00* (2006.01)
(52) U.S. Cl.
USPC .......................................... 375/133; 375/134
(58) Field of Classification Search
USPC ..................... 375/133, 132, 10, 130
See application file for complete search history.

(56) References Cited

U.S. PATENT DOCUMENTS

| 2002/0136268 A1* | 9/2002 | Gan et al. ....................... 375/133 |
| 2005/0020271 A1 | 1/2005 | Fukuda et al. |
| 2007/0218917 A1* | 9/2007 | Frederiksen et al. ......... 455/450 |

FOREIGN PATENT DOCUMENTS

| GB | 2385747 A | 8/2003 |
| WO | WO 02/060211 A2 | 8/2002 |

OTHER PUBLICATIONS

International Search Report for PCT/FR2011/050892 dated Aug. 16, 2011.

* cited by examiner

*Primary Examiner* — Chieh M Fan
*Assistant Examiner* — Brian J Stevens
(74) *Attorney, Agent, or Firm* — Knobbe Martens Olson & Bear LLP

(57) ABSTRACT

The invention relates to a method for determining a set of frequencies that can be used in a frequency plane for transmitting information between transceivers of a network operating with frequency hopping. One inventive aspect includes determining an initial set of frequencies that can be used, whose variations having a magnitude lower than a threshold, monitoring first and second portions of the frequency plane, the first portion comprising the set of frequencies that can be used, the second portion comprising frequencies that do not belong to that set of frequencies, and subsequently determining a new set of frequencies that can be used. The determination associated with the first portion has a first threshold, and the determination associated with the second portion has a second threshold which is separate from the first.

16 Claims, 4 Drawing Sheets

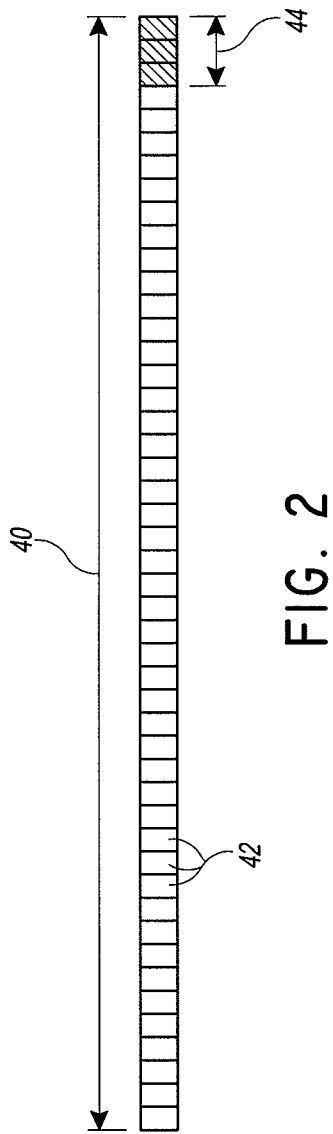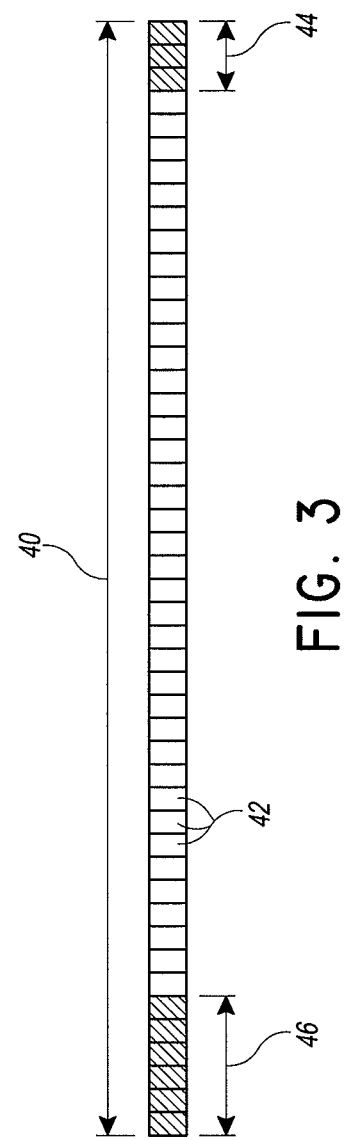

METHOD AND DEVICE FOR DETERMINING A SET OF FREQUENCIES THAT CAN BE USED FOR TRANSMITTING INFORMATION BETWEEN RADIO TRANSCEIVERS OF A NETWORK OPERATING WITH FREQUENCY HOPPING

CROSS-REFERENCE TO RELATED APPLICATIONS

This application is a continuation and claims benefit under 35 U.S.C. §§120 and 365 of PCT Application No. PCT/FR2011/050892, entitled "METHOD AND DEVICE FOR DETERMINING A SET OF FREQUENCIES THAT CAN BE USED FOR TRANSMITTING INFORMATION BETWEEN RADIO TRANSCEIVERS OF A NETWORK OPERATING WITH FREQUENCY HOPPING," filed Apr. 19, 2011, which is herein incorporated by reference in its entirety and which claims priority to French Application No. 10/01675, filed Apr. 20, 2010, which is herein incorporated by reference in its entirety.

BACKGROUND OF THE INVENTION

Field of the Invention

The invention relates to information transmission between radio transmitters of a network.

SUMMARY OF CERTAIN ASPECTS OF THE INVENTION

The present invention relates to a method for determining a set of frequencies which may be used in a frequency plane for transmitting information between at least two radio transceivers of a same network operating with frequency hopping, the method comprising:
  a step for initially determining an initial set of frequencies which may be used, each frequency of the initial set having a variable quantity with a value lower than a comparison threshold,
  at least one step for monitoring first and second portions of the frequency plane, the first monitored portion including the set of frequencies which may be used, determined at the end of the previous determination step, the second monitored portion including frequencies not belonging to the set of frequencies which may be used, determined at the end of the previous determination step, and
  at least one step for subsequently determining a new set of frequencies which may be used, associated with said monitored portion, each frequency of the new set having a variable quantity with a value less than the comparison threshold associated with the subsequent determination step, the monitoring step and the subsequent determination step being carried out automatically by a transceiver.

The present invention also relates to a method for transmitting information between radio transceivers of a network operating with frequency hopping.

The present invention relates to a device for determining a set of frequencies which may be used in a frequency plane, for transmitting information between at least two radio transceivers of a same network operating with frequency hopping, the device comprising:
  means for initially determining an initial set of frequencies which may be used, each frequency of the initial set having a variable quantity with a value less than a comparison threshold,
  means for monitoring first and second portions of the frequency plane, the first monitored portion including the set of frequencies which may be used, determined at the end of the previous determination step, the second monitored portion including frequencies not belonging to the previous set of frequencies which may be used, and
  means for subsequently determining a new set of frequencies which may be used, associated with said monitored portion, each frequency of the new set having a variable quantity with a value less than the comparison threshold, the monitoring means, respectively the subsequent determination means, being able to carry out automatically the monitoring of said portion, respectively the subsequent determination of a new set of frequencies which may be used.

The present invention also relates to a transmission network able to operate with frequency hopping in a frequency plane and including a plurality of radio transceivers, at least one transceiver including such a device for determining a set of frequencies which may be used.

The invention more particularly relates to a transmission network including at least three transceivers, each transceiver being able to transmit data in a conference to other transceivers of the network.

A method for determining a set of frequencies which may be used of the aforementioned type, is known. The determination of the set of frequencies which may be used, is carried out during a phase for initialization of the transmission network by a master transceiver of the synchronization between the transceivers of the network. For this purpose, the master transceiver searches for the frequencies of the predetermined frequency plane, having an error rate on the bits, also called BER (Bit Error Rate), less than a comparison threshold, the value of which is predetermined.

The set of frequencies which may be used is regularly updated during subsequent steps for determining said set, by taking into account the predetermined frequency plane set. Scrambled frequencies, i.e. which cannot be used, at the end of a previous determination step, may then be determined as being able to be used again during the updating of the set of frequencies which may be used.

At the end of the determination of each set of frequencies which may be used, the master transceiver broadcasts the determined set of frequencies which may be used to the other transceivers of the network. The transceivers of the network then transmit data with frequency hopping on the set of frequencies which may be used, broadcast to all the transceivers.

However, the set of frequencies which may be used, significantly varies over time, and risks perturbing the transmission of data between transceivers.

The object of the invention is therefore to propose a determination method with which the fluctuations of the set of the frequencies which may be used, may be limited over time, while improving the transmission of data between transceivers of the transmission network.

For this purpose, the object of the invention is a determination method of the aforementioned type, characterized in that the subsequent determination step associated with the first monitored portion has a first comparison threshold, and in that the subsequent determination step associated with the second monitored portion has a second comparison threshold with a value distinct from that of the first comparison threshold.

According to other embodiments, the determination method comprises one or more of the following features, taken individually or according to all technically possible combinations:
- the second comparison threshold has a value less than the first comparison threshold;
- a frequency of the first monitored portion is suppressed from the new set of frequencies which may be used, only when the value of its variable quantity is greater than the first threshold during a plurality of successive measurements, preferably during three successive measurements;
- a frequency of the second monitored portion is added to the new set of frequencies which may be used only, when the value of its variable quantity is less than the second threshold during a plurality of successive measurements, preferably during three successive measurements;
- the variable quantity is the noise level associated with a respective frequency;
- the frequency plane is a predetermined frequency plane;
- each set of frequencies which may be used, includes a predetermined minimum number of frequencies, the value of the comparison threshold being variable; and
- the network comprises a master transceiver of the synchronization between the transceivers of the network, and the monitoring step and the subsequent determination step are carried out by the master transceiver of the synchronization.

The object of the invention is also a method for transmitting information between at least two radio transceivers of a same network operating with frequency hopping, characterized in that it comprises the following steps:
- determining with a transceiver a set of frequencies which may be used in a frequency plane according to a method as defined above,
- transmitting with said transceiver the set of frequencies which may be used, determined beforehand, to the other transceivers of the network, the set of frequencies which may be used being transmitted regularly, and
- transmitting data with frequency hopping between transceivers on the set of frequencies which may be used, transmitted to all the transceivers of the network.

According to other embodiments, the transmission method comprises one or more of the following features, taken individually or according to all technically possible combinations:
- the set of frequencies which may be used is transmitted at the end of each subsequent determination of a new set of frequencies which may be used; and
- the frequency used for transmitting the information being retained during a step and changing from one step to the other according to a frequency changing law, the frequency changing law is determined for the next step by randomly drawing one frequency from the set of the frequencies of the frequency plane. If the drawn frequency belongs to the set of frequencies which may be used, then the drawn frequency is the frequency used for transmitting the information during the next step, and if the drawn frequency does not belong to the set of frequencies which may be used, then the frequency used for transmitting the information during the next step is randomly drawn from the set of frequencies which may be used.

The object of the invention is also a determination device of the aforementioned type, characterized in that the subsequent determination means include a first comparison threshold, associated with the first monitored portion and a second comparison threshold associated with the second monitored portion, with a distinct value from that of the first comparison threshold.

The object of the invention is also a transmission network able to operate with frequency hopping in a frequency plane and including a plurality of radio transceivers, characterized in that at least one transceiver includes a determination device as defined above.

BRIEF DESCRIPTION OF THE DRAWINGS

These features and advantages of the invention will become apparent upon reading the description which follows, only given as a non-limiting example, and made with reference to the appended drawings.

FIG. 2 is an illustration of a synchronous channel when the transmission network is in a communications mode.

FIG. 3 is an illustration of the synchronous channel and of an asynchronous channel when the transmission network is in a general standby mode.

DETAILED DESCRIPTION

Figure 1:
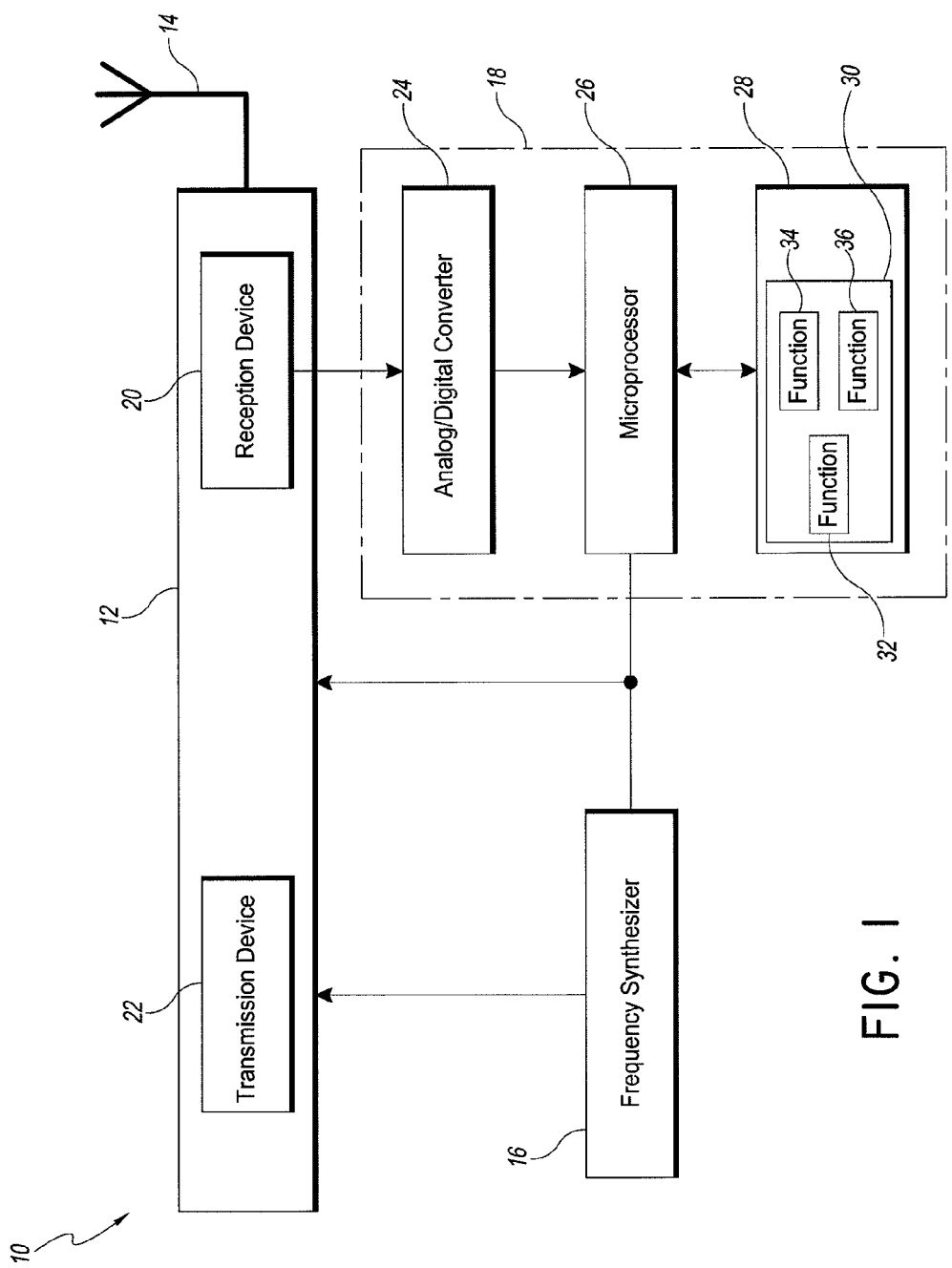
FIG. 1 is a schematic illustration of a transceiver of a transmission network according to the invention.

A transmission network according to the invention includes a plurality of radio transceivers 10, visible in FIG. 1, and is able to operate with frequency hopping. The set of frequencies which may be used by the transmission network operating with frequency hopping is a frequency plane. The frequency plane for example belongs to the domain of high frequencies, also called an HF domain, comprised between 1.5 MHz and 30 MHz. The frequency plane is for example a predetermined frequency plane and will be subsequently called a frequency plane EVF. The transmission network is for example a network having a low transmission throughput, preferably less than 20 kbits per second.

The number of transceivers 10 is for example greater than or equal to three, each transceiver 10 being able to emit data in conference with other transceivers 10 of the network.

Each transceiver 10 comprises, in a way known per se and as illustrated in FIG. 1, a transceiver chain 12, and an antenna 14, a frequency synthesizer 16 and a processing unit 18. Each transceiver 10 is for example compliant with the STANAG-4444 standard.

The transceiver chain 12 is connected to the transceiver antenna 14, to the frequency synthesizer 16 and to the processing unit 18, the frequency synthesizer 16 and the processing unit 18 being also connected together.

The transceiver chain 12 includes a device 20 for receiving radio signals from the antenna 14 and a device 22 for transmitting radio signals towards the antenna 14. The transceiver chain 12 is able to be controlled in a known way by the frequency synthesizer 16.

The processing unit 18 includes an analog/digital converter 24 connected at the output of the reception device 20 of the transceiver chain, a microprocessor 26 connected at the output of the analog/digital converter 24 and a memory 28 connected to the microprocessor 26.

The analog/digital converter 24 is able to transform the voltage or current level provided by the reception device 20 into digital samples of a signal transmitted to the microprocessor 26.

The microprocessor 26 is connected to the frequency synthesizer 16 and to the transceiver chain 12 for transmitting radio signals to other transceivers 10 of the transmission network.

The memory 28 includes a piece of software 30 for determining a set of frequencies which may be used in the frequency plane for transmitting information between two transceivers 10 of a same network.

Each frequency of the set of frequencies which may be used has a variable quantity with a value less than a comparison threshold. In the exemplary embodiments of a network with a low transmission throughput, the variable quantity is the noise level associated with a respective frequency. Alternatively, the variable quantity is the error rate on the bits, also called BER (Bit Error Rate).

The determination software 30 includes a function 32 for initially determining an initial set of frequencies which may be used, a function 34 for monitoring at least one portion of the frequency plane and a function 36 for subsequently determining a new set of frequencies which may be used, associated with said monitored portion. The determination software 30 will be described in more detail subsequently with reference to FIGS. 4 and 5.

Alternatively, the device for determining a set of frequencies which may be used, is made in the form of programmable logic components, or further in the form of dedicated integrated circuits.

In FIGS. 2 and 3, according to the STANAG-4444 standard, the transmission frame is cut up into service intervals 40, each service interval 40 including forty-eight steps 42, the duration of a step 42 is equal to 112.5 ms, and the duration of the service interval 40 is therefore equal to 5.4 s.

When the transmission network is in a communications mode, i.e. when a master transceiver of the synchronization between the transceivers 10 of the network transmits data, the service interval 40, visible in FIG. 2, includes a synchronous channel 44 corresponding to last three steps 42 of the service interval and the other steps of the service interval 40 are used for transmitting data corresponding to the current communication.

When the transmission network is in a general standby mode, i.e. when the master transceiver is not communicating, the service interval 40 includes the synchronous channel 44 and an asynchronous channel 46, as illustrated in FIG. 3. The synchronous channel 44 corresponds to the last three steps 42 of the service interval and the asynchronous channel 46 for example corresponds to the first six 42 of the service interval. Alternatively, the asynchronous channel 46 corresponds to the first nine steps 42 of the service interval.

The method for transmitting information according to the invention applies to the transmission of information in transmission networks formed with a plurality of transceivers 10 operating with frequency hopping, i.e. in a transmission mode where the information is borne on steps 42 with a determined duration. The frequency used for transmitting the information is retained during a step 42, and changes from one step 42 to the other according to a frequency changing law, also called an EVF hopping law.

Figure 4:
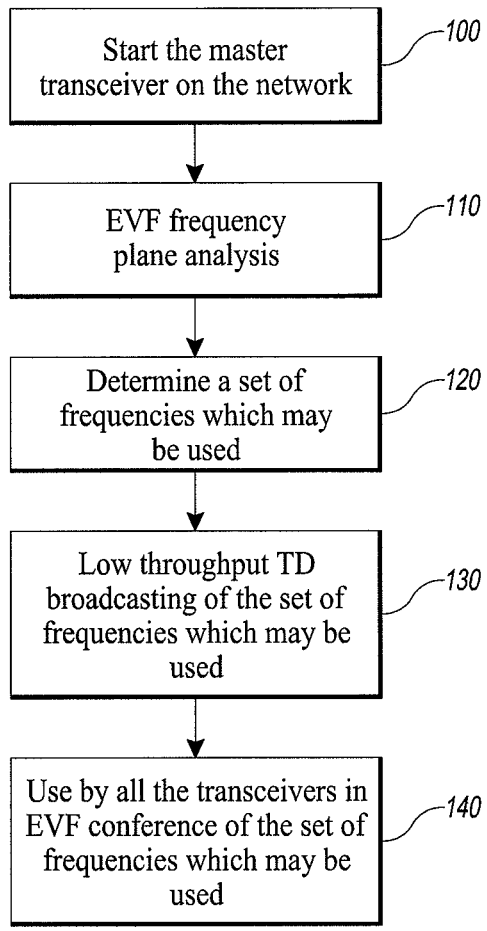
FIG. 4 is a flow chart of an initial phase of a method for transmitting the information according to the invention.
Figure 5:
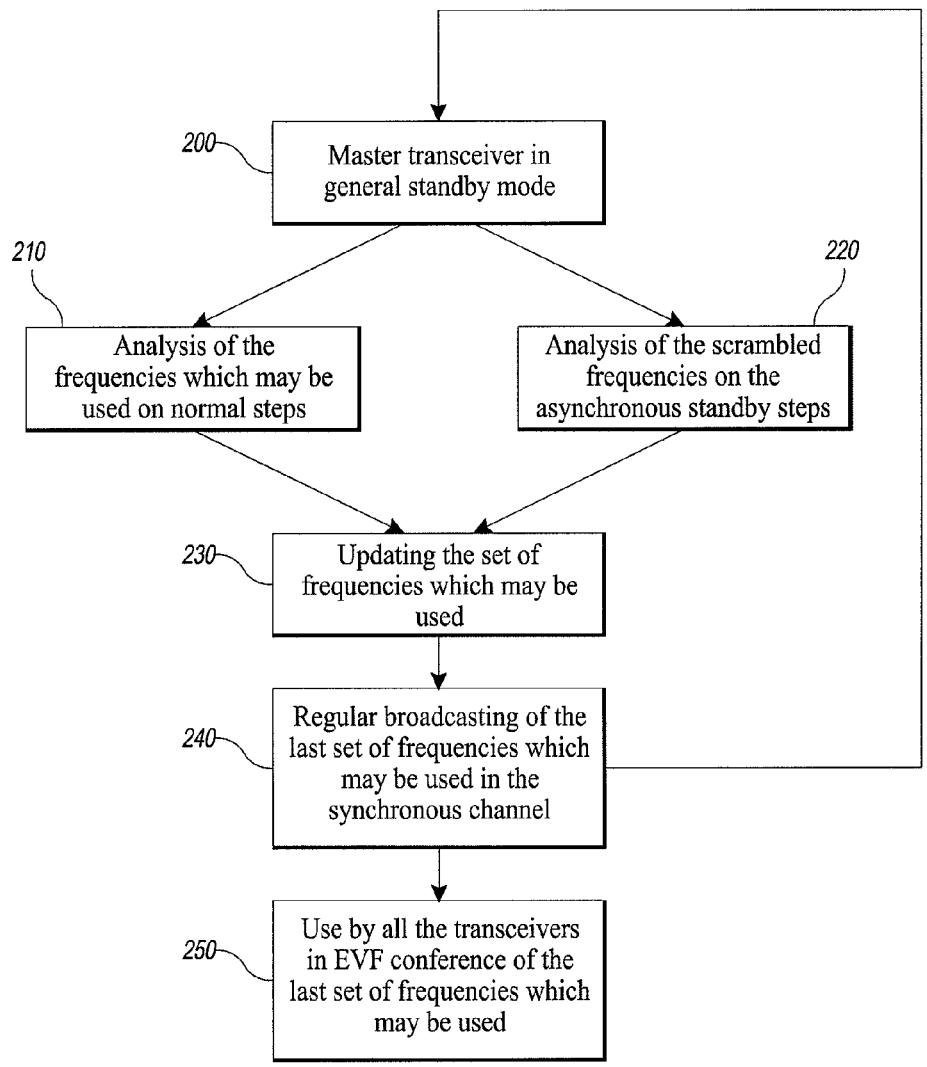
FIG. 5 is a flow chart of a subsequent phase of the method for transmitting the information according to the invention.

The method for transmitting the information will now be described with reference to FIGS. 4 and 5. FIG. 4 illustrates an initial phase of the information transmission method, and FIG. 5 illustrates a subsequent phase of the method taking place after this initial phase.

During step 100 for starting the network operating with frequency hopping, a transceiver from the transceivers 10 of the network is defined as the master of the synchronization between all the transceivers 10. In other words, the first transceiver 10 which sends in a known way synchronization beeps to the whole network becomes the master of the network. The master transceiver is also responsible for managing the EVF frequencies.

At the end of the step for starting the master transceiver and for synchronizing the transceivers 10, the master transceiver analyzes during step 110 the whole of the frequency plane EVF.

During this analysis of the EVF frequency plane, the master transceiver begins by determining the minimum noise level among all the frequencies of the EVF frequency plane. A first comparison threshold S1 is then calculated by adding a noise deviation to the minimum noise determined previously. A frequency search is then carried out in the EVF frequency plane in order to list the frequencies having a noise level below the first comparison threshold S1, as well as those for which the noise level is greater than the first comparison threshold S1.

If the number of frequencies having a noise level below the first comparison threshold S1 is greater than a predetermined minimum number $N_{min}$, then an initial set of frequencies which may be used, includes said frequencies having a noise level below the first comparison threshold S1.

When the number of frequencies having a noise level below the first comparison threshold S1 is less than the minimum number $N_{min}$, a new noise deviation is added to the first comparison threshold S1 in order to calculate a first increased threshold. A new frequency search is then carried out among the frequencies having a noise level above the first comparison threshold S1 in order to list those for which the noise level is less than the first increased threshold.

If the total number of frequencies having a noise level below the first increased threshold is greater than the minimum number $N_{min}$, the initial set of frequencies which may be used, includes said frequencies for which the noise level is less than the first increased threshold. In the opposite case, the process for seeking the frequencies which may be used is iterated, by increasing the value of the first threshold S1 until a number of frequencies which may be used, is obtained which is greater than the predetermined minimum number $N_{min}$.

When the minimum number $N_{min}$ of frequencies having substantially the lowest noise levels is reached, the set of frequencies which may be used is then determined during step 120 by grouping said frequencies having a noise level below the last value of the first comparison threshold S1. A vector of scrambled frequencies comprising the frequencies of the EVF plane not belonging to the set of frequencies which may be used, is also determined.

The set of the frequencies which may be used is then broadcast by the master transceiver to all the other transceivers 10 of the network, during step 130. This broadcast is performed with the most robust available throughput. The duration of the whole of the steps 100 to 130 is preferably less than 30 s.

All the transceivers 10 receiving this set of frequencies which may be used then apply it immediately during step 140 to their frequency plane. As soon as the reception of the set of the frequencies which may be used, has ended, the EVF hopping law is determined for the next step 42 by randomly drawing a frequency from the set of frequencies of the EVF plane. If the drawn frequency belongs to the set of frequencies which may be used, this frequency is retained, and is then the frequency used for transmitting the information during the next step 42. Otherwise, another frequency is randomly drawn from the set of the frequencies which may be used, the drawn frequency from the set of the frequencies which may be used, then being the frequency used for transmitting the information during the next step 42. With this determination of the EVF hopping law, it is possible to retain common steps between a transceiver not having received the set of the frequencies which may be used and a transceiver having received it.

At the end of this phase for initially determining an initial set of frequencies that may be used, the master transceiver regularly transmits the set of the frequencies which may be used on the steps of the synchronous channel 44. Any transceiver receiving this set of frequencies that may be used, then applies it immediately to its frequency plane, as described earlier.

The subsequent phase of the transmission method according to the invention, visible in FIG. 5, will now be described.

When the master transceiver is in a general standby mode (step 200), i.e. when it is not communicating, the master transceiver monitors the set of the frequencies which may be used on so-called normal steps during step 210. The normal steps correspond to the steps of the service interval 40 neither belonging to the synchronous channel 44 nor to the asynchronous channel 46.

The master transceiver also monitors during step 220, the frequencies belonging to the last vector of scrambled frequencies when it is in a general standby mode, and in an asynchronous channel 46. The master transceiver for example allocates one asynchronous channel 46 out of two for monitoring the frequencies of the scrambled frequency vector.

At the end of each of these monitoring steps, the master transceiver updates the set of frequencies which may be used during step 230 by determining a new set of frequencies which may be used, associated with the portion of the plane of monitored frequencies.

More specifically, when a frequency of the last set of frequencies which may be used (step 210) has a noise level greater than the first comparison threshold S1, the frequency is considered as scrambled and is suppressed from the new set of frequencies which may be used. When a frequency not belonging to the last set of frequencies which may be used (step 220), i.e. belonging to the last vector of scrambled frequencies, has a noise level less than a second comparison threshold S2, said frequency is no longer considered as being scrambled and is added to the new set of frequencies which may be used.

The second comparison threshold S2 has a value distinct from that of the first comparison threshold S1, the value of the second threshold S2 preferably being less than that of the first threshold S1.

With this value difference between the thresholds S1, S2, it is also possible to improve the stability of the determination method by avoiding that the frequencies have a noise level close to the comparison thresholds S1, S2, do not change too often their status, by passing from the status of a frequency which may be used to that of a scrambled frequency, or conversely from that of a scrambled frequency to that of a frequency which may be used.

Alternatively, a frequency of the last set of frequencies which may be used is considered as scrambled and is suppressed from the new set of frequencies which may be used, only if it has a noise level above the first threshold S1 during a plurality of successive measurements, preferably during three successive measurements. Likewise, a frequency of the last scrambled frequency vector is considered as able to be used, and is added to the new set of frequencies which may be used, only when it has a noise level less than the second threshold S2 during a plurality of successive measurements, preferably during three successive measurements.

The addition of this additional condition relating to the plurality of successive measurements also allows improvement in the stability of the method for determining the set of frequencies which may be used. Indeed, this gives the possibility of avoiding that a frequency be alternately considered as being able to be used, and then as scrambled, at each new measurement when it has a noise level close to the first and second thresholds S1, S2.

During the updating step 230, if the number of frequencies which may be used is no longer greater than the predetermined minimum number $N_{min}$, for example in the case when a certain number of frequencies of the last set of frequencies which may be used, has a too significant noise level and are considered from now on as scrambled, the value of the first threshold S1 is increased. The analysis of the noise level of the frequencies of the set of the frequencies which may be used (step 210) is then again carried out so that the new set of frequencies which may be used, includes a number of frequencies greater than the minimum number $N_{min}$.

The variable value of the first threshold S1 therefore gives the possibility of guaranteeing that the set of the frequencies which may be used includes at any moment the predetermined minimum number $N_{min}$ of frequencies.

At the end of the updating step 230, the new set of frequencies which may be used is broadcast (step 240) in the first synchronous channel 44 by the master transceivers to all the other transceivers 10 of the network.

At the end of the broadcasting step 240, the master transceiver returns to step 200 where it is again in a general standby mode, in order to reiterate the subsequent phase of the transmission method and to allow a possible new update of the set of the frequencies which may be used.

All the transceivers 10 receiving this new set of frequencies which may be used, apply it immediately to their frequency plane in order to use it during step 150 in EVF conference. The EVF hopping law is changed in a similar way to what was described earlier for step 140 of the initial phase of the information transmission method.

Steps 200 to 240 of the subsequent phase of the transmission method are achieved regularly and automatically by the master transceiver, thereby allowing regular and automatic updating of the set of the frequencies which may be used.

This update of the frequencies which may be used gives the possibility of retaining the quality of the transmission of data between transceivers 10 of the network over time and is not perceivable for the user of the master transceiver.

While the present invention has been described in some detail for purposes of clarity and understanding, one skilled in the art will appreciate that various changes in form and detail can be made without departing from the true scope of the invention.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for determining a set of frequencies which may be used in a frequency plane, for the transmission of information between at least two radio transceivers of a same network operating with frequency hopping, the method comprising:

determining an initial set of frequencies which may be used, each frequency of the initial set having a variable quantity with a value below a comparison threshold;

monitoring first and second portions of the frequency plane, the first monitored portion including the set of the frequencies which may be used, determined at the end of the previous determination step, the second monitored portion including frequencies not belonging to the set of the frequencies which may be used, determined at the end of the previous determination step; and subsequently determining a new set of frequencies which may be used associated with at least one of the monitored portions, each frequency of the new set having a variable quantity with a value below a comparison threshold associated with this subsequent determination step, wherein a step of monitoring the first and second portions and the subsequent determination step are performed automatically by a transceiver, wherein the subsequent determination step associated with the first monitored portion has a first comparison threshold and in that the subsequent determination step associated with the second monitored portion has a second comparison threshold with a value distinct from that of the first comparison threshold, wherein a frequency of the first monitored portion is suppressed from the new set of frequencies which may be used only when the value of its variable quantity is greater than the first threshold during a plurality of successive measurements.

2. The method according to claim 1, wherein the second comparison threshold has a value below that of the first comparison threshold.

3. The method according to claim 1, wherein the variable quantity is the noise level associated with a respective frequency.

4. The method according to claim 1, wherein the frequency plane is a predetermined frequency plane.

5. The method according to claim 1, wherein each set of frequencies, which may be used, includes a predetermined minimum number of frequencies, the value of the comparison threshold being variable.

6. A method for determining a set of frequencies which may be used in a frequency plane, for the transmission of information between at least two radio transceivers of a same network operating with frequency hopping, the method comprising:

determining an initial set of frequencies which may be used, each frequency of the initial set having a variable quantity with a value below a comparison threshold;

monitoring first and second portions of the frequency plane, the first monitored portion including the set of the frequencies which may be used, determined at the end of the previous determination step, the second monitored portion including frequencies not belonging to the set of the frequencies which may be used, determined at the end of the previous determination step; and subsequently determining a new set of frequencies which may be used associated with at least one of the monitored portions, each frequency of the new set having a variable quantity with a value below a comparison threshold associated with this subsequent determination step, wherein a step of monitoring the first and second portions and the subsequent determination step are performed automatically by a transceiver, wherein the subsequent determination step associated with the first monitored portion has a first comparison threshold and in that the subsequent determination step associated with the second monitored portion has a second comparison threshold with a value distinct from that of the first comparison threshold, wherein a frequency of the second monitored portion is added to the new set of frequencies which may be used only when the value of its variable quantity is less than the second threshold during a plurality of successive measurements.

7. A method for determining a set of frequencies which may be used in a frequency plane, for the transmission of information between at least two radio transceivers of a same network operating with frequency hopping, the method comprising:

determining an initial set of frequencies which may be used, each frequency of the initial set having a variable quantity with a value below a comparison threshold;

monitoring first and second portions of the frequency plane, the first monitored portion including the set of the frequencies which may be used, determined at the end of the previous determination step, the second monitored portion including frequencies not belonging to the set of the frequencies which may be used, determined at the end of the previous determination step; and subsequently determining a new set of frequencies which may be used associated with at least one of the monitored portions, each frequency of the new set having a variable quantity with a value below a comparison threshold associated with this subsequent determination step, wherein a step of monitoring the first and second portions and the subsequent determination step are performed automatically by a transceiver, wherein the subsequent determination step associated with the first monitored portion has a first comparison threshold and in that the subsequent determination step associated with the second monitored portion has a second comparison threshold with a value distinct from that of the first comparison threshold, the network comprising a master transceiver of the synchronization between the transceivers of the network, the method in which the monitoring step and the subsequent determination step are carried out by the master transceiver of the synchronization.

8. A method for determining a set of frequencies which may be used in a frequency plane, for the transmission of information between at least two radio transceivers of a same network operating with frequency hopping, the method comprising:

determining an initial set of frequencies which may be used, each frequency of the initial set having a variable quantity with a value below a comparison threshold;

monitoring first and second portions of the frequency plane, the first monitored portion including the set of the frequencies which may be used, determined at the end of the previous determination step, the second monitored portion including frequencies not belonging to the set of the frequencies which may be used, determined at the end of the previous determination step; and subsequently determining a new set of frequencies which may be used associated with at least one of the monitored portions, each frequency of the new set having a variable quantity with a value below a comparison threshold associated with this subsequent determination step, wherein a step of monitoring the first and second portions and the subsequent determination step are performed automatically by a transceiver, wherein the subsequent determination step associated with the first monitored portion has a first comparison threshold and in that the subsequent determination step associated with the second monitored portion has a second comparison threshold with a value distinct from that of the first comparison threshold;

transmitting with said transceiver, the set of frequencies which may be used, determined beforehand to the other transceivers of the network, the set of frequencies which may be used being regularly transmitted; and transmitting data with frequency hopping between transceivers on the set of the frequencies which may be used, transmitted to all the transceivers of the network.

9. The transmission method according to claim 8, wherein the set of frequencies which may be used is transmitted at the end of each subsequent determination of a new set of frequencies which may be used.

10. The transmission method according to claim 9, the frequency used for the transmission of the information being retained during a step, and changing from one step to the other according to a frequency changing law, wherein the frequency changing law is determined for a next step by randomly drawing a frequency from the set of the frequencies of the frequency plane, wherein if the drawn frequency belongs to the set of frequencies which may be used, then the frequency drawn is the frequency used for transmitting the information during the next step, wherein, if the drawn frequency does not belong to the set of the frequencies which may be used, then the frequency used for transmitting the information during the next step is randomly drawn from the set of the frequencies which may be used.

11. The transmission method according to claim 8, the frequency used for the transmission of the information being retained during a step, and changing from one step to the other according to a frequency changing law, wherein the frequency changing law is determined for a next step by randomly drawing a frequency from the set of the frequencies of the frequency plane, wherein if the drawn frequency belongs to the set of frequencies which may be used, then the frequency drawn is the frequency used for transmitting the information during the next step, wherein if the drawn frequency does not belong to the set of the frequencies which may be used, then the frequency used for transmitting the information during the next step is randomly drawn from the set of the frequencies which may be used.

12. A device for determining a set of frequencies which may be used in a frequency plane, for transmitting information between at least two radio transceivers of a same network operating with frequency hopping, the device comprising:

a mechanism for initially determining an initial set of frequencies which may be used, each frequency of the initial set having a variable quantity with a value less than a comparison threshold;

a mechanism for monitoring first and second portions of the frequency plane, the first monitored portion including the set of frequencies which may be used determined at the end of the preceding determination step, the second monitored portion including frequencies not belonging to the preceding set of frequencies which may be used; and a mechanism for subsequently determining a new set of frequencies which may be used, associated with at least one of the monitored portions, each frequency of the new set having a variable quantity with a value less than the comparison threshold, the monitoring mechanism, respectively the subsequent determination mechanism being able to carry out automatically the monitoring of the first and second portions, respectively the subsequent determination of the new set of frequencies which may be used, wherein the subsequent determination mechanism includes a first comparison threshold associated with the first monitored portion and a second comparison threshold associated with the second monitored portion, with a value distinct from that of the first comparison threshold, wherein a frequency of the first monitored portion is suppressed from the new set of frequencies which may be used only when the value of its variable quantity is greater than the first threshold during a plurality of successive measurements.

13. A transmission network able to operate with frequency hopping in a frequency plane and including a plurality of radio transceivers wherein at least one transceiver includes a determination device according to claim 12.

14. A device for determining a set of frequencies which may be used in a frequency plane, for transmitting information between at least two radio transceivers of a same network operating with frequency hopping, the device comprising:

a mechanism for initially determining an initial set of frequencies which may be used, each frequency of the initial set having a variable quantity with a value less than a comparison threshold;

a mechanism for monitoring first and second portions of the frequency plane, the first monitored portion including the set of frequencies which may be used determined at the end of the preceding determination step, the second monitored portion including frequencies not belonging to the preceding set of frequencies which may be used; and a mechanism for subsequently determining a new set of frequencies which may be used, associated with at least one of the monitored portions, each frequency of the new set having a variable quantity with a value less than the comparison threshold, the monitoring mechanism, respectively the subsequent determination mechanism being able to carry out automatically the monitoring of the first and second portions, respectively the subsequent determination of the new set of frequencies which may be used, wherein the subsequent determination mechanism includes a first comparison threshold associated with the first monitored portion and a second comparison threshold associated with the second monitored portion, with a value distinct from that of the first comparison threshold, wherein a frequency of the second monitored portion is added to the new set of frequencies which may be used only when the value of its variable quantity is less than the second threshold during a plurality of successive measurements.

15. A device for determining a set of frequencies which may be used in a frequency plane, for transmitting information between at least two radio transceivers of a same network operating with frequency hopping, the device comprising:
- a mechanism for initially determining an initial set of frequencies which may be used, each frequency of the initial set having a variable quantity with a value less than a comparison threshold;
- a mechanism for monitoring first and second portions of the frequency plane, the first monitored portion including the set of frequencies which may be used determined at the end of the preceding determination step, the second monitored portion including frequencies not belonging to the preceding set of frequencies which may be used; and
- a mechanism for subsequently determining a new set of frequencies which may be used, associated with at least one of the monitored portions, each frequency of the new set having a variable quantity with a value less than the comparison threshold,
- the monitoring mechanism, respectively the subsequent determination mechanism being able to carry out automatically the monitoring of the first and second portions, respectively the subsequent determination of the new set of frequencies which may be used;
- wherein the subsequent determination mechanism includes a first comparison threshold associated with the first monitored portion and a second comparison threshold associated with the second monitored portion, with a value distinct from that of the first comparison threshold,
- the network comprising a master transceiver of the synchronization between the transceivers of the network, the monitoring mechanism and the subsequent determination mechanism are carried out by the master transceiver of the synchronization.

16. A device for determining a set of frequencies which may be used in a frequency plane, for transmitting information between at least two radio transceivers of a same network operating with frequency hopping, the device comprising:
- a mechanism for initially determining an initial set of frequencies which may be used, each frequency of the initial set having a variable quantity with a value less than a comparison threshold;
- a mechanism for monitoring first and second portions of the frequency plane, the first monitored portion including the set of frequencies which may be used determined at the end of the preceding determination step, the second monitored portion including frequencies not belonging to the preceding set of frequencies which may be used; and
- a mechanism for subsequently determining a new set of frequencies which may be used, associated with at least one of the monitored portions, each frequency of the new set having a variable quantity with a value less than the comparison threshold,
- the monitoring mechanism, respectively the subsequent determination mechanism being able to carry out automatically the monitoring of the first and second portions, respectively the subsequent determination of the new set of frequencies which may be used,
- wherein the subsequent determination mechanism includes a first comparison threshold associated with the first monitored portion and a second comparison threshold associated with the second monitored portion, with a value distinct from that of the first comparison threshold;
- a mechanism for transmitting with said transceiver, the set of frequencies which may be used, determined beforehand to the other transceivers of the network, the set of frequencies which may be used being regularly transmitted; and
- a mechanism for transmitting data with frequency hopping between transceivers on the set of the frequencies which may be used, transmitted to all the transceivers of the network.

* * * * *